United States Patent
Woo (10) Patent No.: US 8,976,180 B2
(45) Date of Patent: *Mar. 10, 2015

(54) METHOD, MEDIUM AND SYSTEM RENDERING 3-D GRAPHICS DATA HAVING AN OBJECT TO WHICH A MOTION BLUR EFFECT IS TO BE APPLIED

(71) Applicant: Samsung Electronics Co., Ltd., Suwon-si, Gyeonggi-do (KR)

(72) Inventor: Sang-oak Woo, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,884

(22) Filed: Feb. 24, 2014

(65) Prior Publication Data

US 2014/0168209 A1  Jun. 19, 2014

Related U.S. Application Data

(63) Continuation of application No. 11/785,247, filed on Apr. 16, 2007, now Pat. No. 8,687,002.

(30) Foreign Application Priority Data

Sep. 29, 2006 (KR) ........................ 10-2006-0096396

(51) Int. Cl.
*G06T 15/10* (2011.01)
*G06T 15/00* (2011.01)
*G06T 13/00* (2011.01)
(Continued)

(52) U.S. Cl.
CPC ............... *G06T 15/005* (2013.01); *G06T 13/20* (2013.01); *G06T 5/002* (2013.01)

USPC ........... 345/427; 345/419; 345/473; 345/474; 345/592; 345/629; 345/634

(58) Field of Classification Search
None
See application file for complete search history.

(56) References Cited

U.S. PATENT DOCUMENTS 6,326,967 B1 * 12/2001 Inoue ............................ 345/427
6,720,976 B1 *  4/2004 Shimizu et al. ............... 345/629
(Continued)

FOREIGN PATENT DOCUMENTS

| EP | 0-948-979 A2 | 3/1999 |
| EP | 0948979 A2 | 10/1999 |

(Continued)

OTHER PUBLICATIONS

Kawagishi, Y. et al., "Cartoon Blur: Non-Photorealistic Motion Blur", Computer Graphics International, 2003, Proceedings, Digital Object Identifier: 10.1109/CGI.2003.1214482, Publication Year: 2003, pp. 276-281.*

(Continued)

*Primary Examiner* — Maurice L McDowell, Jr.
*Assistant Examiner* — Donna J Ricks
(74) *Attorney, Agent, or Firm* — NSIP Law (57) ABSTRACT

A 3D graphics rendering method, medium and system that provide a motion blur effect. Clone objects of an object are generated based on animation information of the object to which a motion blur effect is to be applied and 3D graphics data including the generated clone objects is rendered, thereby providing a motion blur effect without using accumulation buffers.

7 Claims, 5 Drawing Sheets
(1 of 5 Drawing Sheet(s) Filed in Color)

(51) Int. Cl.
*G09G 5/02* (2006.01)
*G09G 5/00* (2006.01)
*G06T 13/20* (2011.01)
*G06T 5/00* (2006.01)

(56) References Cited

U.S. PATENT DOCUMENTS

| | | | |
|---|---|---|---|
| 2002/0089515 | A1 | 7/2002 | Yamamoto |
| 2003/0007701 | A1 | 1/2003 | Herf |
| 2003/0234789 | A1 | 12/2003 | Gritz |
| 2004/0085356 | A1* | 5/2004 | Kake et al. ............ 345/757 |
| 2005/0134598 | A1 | 6/2005 | Baxter et al. |
| 2007/0153006 | A1* | 7/2007 | Robbins et al. ............ 345/474 |

FOREIGN PATENT DOCUMENTS

| | | |
|---|---|---|
| EP | 0948979 A3 | 12/2002 |
| JP | 7-93586 | 4/1995 |
| JP | 2001-160153 | 6/2001 |
| JP | 2002-298152 | 10/2002 |
| JP | 2003-51024 | 2/2003 |
| JP | 2004-276415 | 10/2004 |
| KR | 10-2005-0101915 | 10/2005 |
| WO | 2005/066899 A1 | 7/2005 |

OTHER PUBLICATIONS

Kato, Y. et al., Effect lines for specifying animation effects. In Proceedings of the 2004 IEEE Symposium on Visual Languages and Human-Centric Computing. (Sep. 27-30, Rome), 27-34.*
Jones et al., "Real-Time Geometric Motion Blur for a Deforming Polygonal Mesh", Computer Graphics International 2005 Stony Brook, NY, USA, IEEE, Jun. 22-24, 2005, pp. 14-18.*
Baudisch, P. et al., High-density cursor: a visualization technique that helps users keep track of fast-moving mouse cursors, Pro. Interact 2003, IOS Press, 2003, pp. 236-243.*
"Motion Blur" dated Oct. 15, 2007 (in English).
Kato, Y. et al., Effect lines for specifying animation effects. 2004 IEEE Symposium of Visual Languages and Human-Centric Computing. (Sep. 27-30, Rome), 27-34.
Feng, Z. et al., Real-time rendering of raining animation based on the graphics hardware acceleration. Proceedings of the Ninth International Conference on Computer Supported Cooperative Work in Design, 2005., vol. 2, pp. 734-739, May 2005.
Akenine-Moller et al., Real Time Rendering Second Edition, 2002, p. 236-237, *Section 6.8 Motion Blur* (inside front cover, copyright page, table of contents pp. vii-x, pp. 236-237).
Jones et al., "Real-Time Geometric Motion Blur for a Deforming Polygonal Mesh", Computer Graphics International 2005 Stony Brook, NY, USA, IEEE, Jun. 22-24, 2005, pp. 6 (pp. 26-31) (in English).
Kawagishi, Y. et al., "Cartoon Blur: Non-Photorealistic Motion Blur", Computer Graphics International, 2003, Proceedings, Digital Object Identifier: 10.1109/CGI.2003.1214482, Publication Year: 2003, pp. 276-281.
Korean Office Action issued Oct. 26, 2007 in corresponding Korean Patent Application No. 10-2006-0096396.
European Search Report issued Feb. 5, 2008 in corresponding European Patent Application No. 07111490.
Chinese Office Action issued Oct. 8, 2010 in corresponding Chinese Patent Application No. 200710136269.2.
Japanese Office Action issued Mar. 6, 2012 in corresponding Japanese Patent Application No. 2007-180896.
Japanese Office Action issued Aug. 14, 2012 in corresponding Japanese Patent Application No. 2007-180896.
U.S. Office Action issued Apr. 2, 2010 in copending U.S. Appl. No. 11/785,247.
U.S. Office Action issued Oct. 22, 2010 in copending U.S. Appl. No. 11/785,247.
U.S. Office Action issued Mar. 21, 2011 in copending U.S. Appl. No. 11/785,247.
U.S. Office Action issued Oct. 26, 2011 in copending U.S. Appl. No. 11/785,247.
U.S. Office Action issued Apr. 9, 2012 in copending U.S. Appl. No. 11/785,247.
U.S. Office Action issued Sep. 19, 2012 in copending U.S. Appl. No. 11/785,247.
U.S. Office Action issued Mar. 15, 2013 in copending U.S. Appl. No. 11/785,247.
U.S. Notice of Allowance issued Jul. 11, 2013 in copending U.S. Appl. No. 11/785,247.
U.S. Notice of Allowance issued Nov. 27, 2013 in copending U.S. Appl. No. 11/785,247.
U.S. Appl. No. 11/785,247, filed Apr. 16, 2007, Sang-oak Woo, Samsung Electronics Co., Ltd.

* cited by examiner

METHOD, MEDIUM AND SYSTEM RENDERING 3-D GRAPHICS DATA HAVING AN OBJECT TO WHICH A MOTION BLUR EFFECT IS TO BE APPLIED

CROSS-REFERENCE TO RELATED APPLICATIONS

This application is a continuation of U.S. application Ser. No. 11/785,247 filed Apr. 16, 2007 which claims the benefit of Korean Patent Application No. 10-2006-0096396, filed on Sep. 29, 2006, in the Korean Intellectual Property Office, the disclosure of which is incorporated herein in its entirety by reference.

BACKGROUND

1. Field

One or more embodiments of the present invention relate to a 3-dimensional (3D) graphics rendering method, medium and system, and more particularly, to a 3D graphics rendering method, medium and system that apply a motion blur effect to an object.

2. Description of the Related Art

The term "motion blur effect" generally refers to when any object is moved and due to the movement of the object, or movement of a camera relative to the object, the object appears blurred. In general, 3-dimensional (3D) graphics animations continuously output images of 25 to 30 frames per second, and thus there is no motion blur effect. However, if any object moves substantially, the object may appear blurred. This is perceived as natural because of the way humans perceive motion. Consequently, 3D graphics animations, to which a motion blur effect does not apply, may appear unnatural to the human eye. Therefore, a motion blur effect is a graphics effect which may make 3D graphics animations appear more realistic and natural to the human eye.

Figure 1:
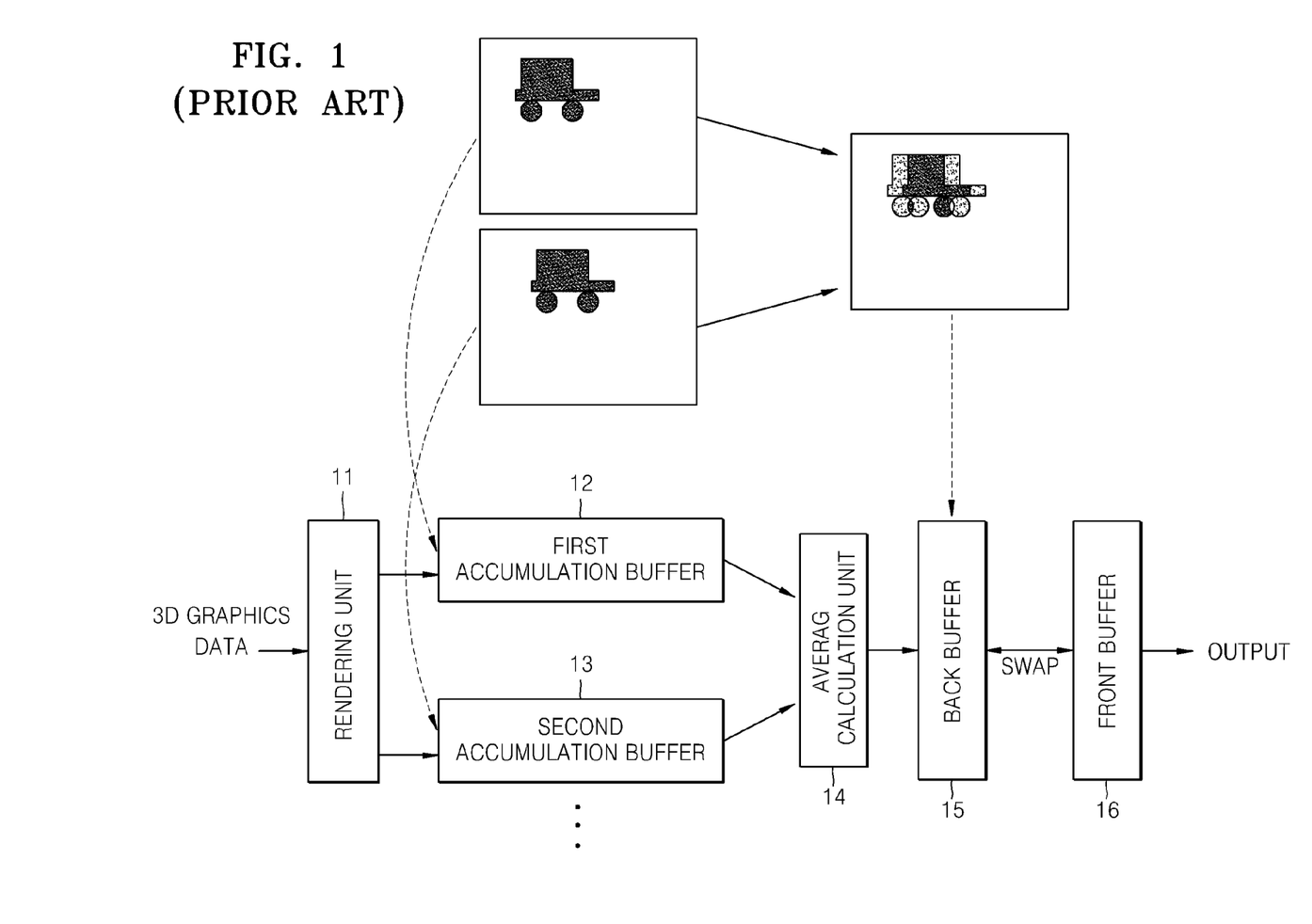
FIG. 1 illustrates a conventional 3D graphics rendering system which provides a motion blur effect.

FIG. 1 illustrates a conventional 3D graphics rendering apparatus, which provides a motion blur effect.

Referring to FIG. 1, the conventional 3D graphics rendering apparatus includes a rendering unit 11, a first accumulation buffer 12, a second accumulation buffer 13, an average calculation unit 14, a back buffer 15, and a front buffer 16. In FIG. 1, only two accumulation buffers are illustrated. However, in order to show an excellent motion blur effect, more than two accumulation buffers are needed.

The rendering unit 11 renders 3D graphics data in the back buffer 15 and motions illustrated by the 3D graphics data are rendered in the accumulation buffers 12 and 13, respectively. The average calculation unit 14 calculates an average of the images that are rendered in each of the accumulation buffers 12 and 13. Then, the result is stored in the back buffer 15. When any complete image is stored in the back buffer 15, an image stored in the front buffer 16 is replaced with the image stored in the back buffer 15. The image stored in the front buffer 16 is outputted to a display device (not illustrated).

Figure 2:
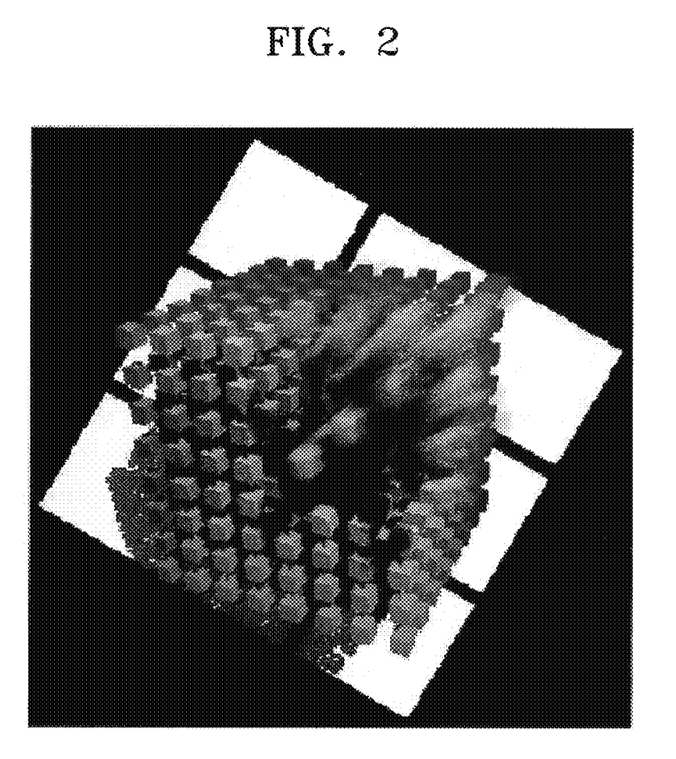
FIG. 2 illustrates an image to which a motion blur effect is applied.

FIG. 2 is an example of an image to which a motion blur effect has been applied. If many accumulation buffers are used, a significantly soft motion blur effect can be illustrated as in FIG. 2.

As described above, in order for a conventional 3D graphics rendering apparatus to provide a motion blur effect, motions illustrated from 3D graphics should be rendered in each of the accumulation buffers 12 and 13, respectively, and thus a large amount of calculation is required, and in particular, large memory resources that are used to maintain the accumulation buffers 12 and 13 are required. Therefore, it is difficult for mobile devices, in which hardware resources such as memory resources and calculating ability are limited, to provide a motion blur effect.

SUMMARY

One or more embodiments of the present invention provide a 3-dimensional graphics rendering method and system which can efficiently provide a motion blur effect in mobile devices in which hardware resources such as memory resources and calculating ability are limited.

One or more embodiments of the present invention also provide a computer readable medium having embodied thereon a computer program for executing the method described above.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a rendering method including generating clone objects of a predetermined object based on information of the predetermined object illustrated by graphics data, and rendering the graphics data including the generated clone objects.

To achieve at least the above and/or other aspects and advantages, embodiments of the present invention include at least one medium includes computer readable code to control at least one processing element in a computer to implement a rendering method. The method includes generating clone objects of a predetermined object based on information of the predetermined object illustrated by graphics data, and rendering the graphics data including the generated clone objects.

To achieve at least the above and/or other aspects and advantages, embodiments of the present invention include a rendering system including a clone object generation unit to generate clone objects of a predetermined object based on information of the predetermined object illustrated by graphics data, and a rendering unit to render graphics data including the clone objects.

To achieve at least the above and/or other aspects and advantages, embodiments of the present invention include a method for rendering 3-D graphics data having an object to which a motion blur effect is to be applied. The method includes generating a plurality of clone objects of the object to which the motion blur effect is to be applied, using information of the object detected from the 3D graphics data, and setting a transparency alpha for each of the plurality of clone objects, based on the number of clone objects generated.

BRIEF DESCRIPTION OF THE DRAWINGS

The patent or application file contains at least one drawing executed in color. Copies of this patent or patent application publication with color drawings will be provided by the Office upon request and payment of the necessary fee.

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 3:
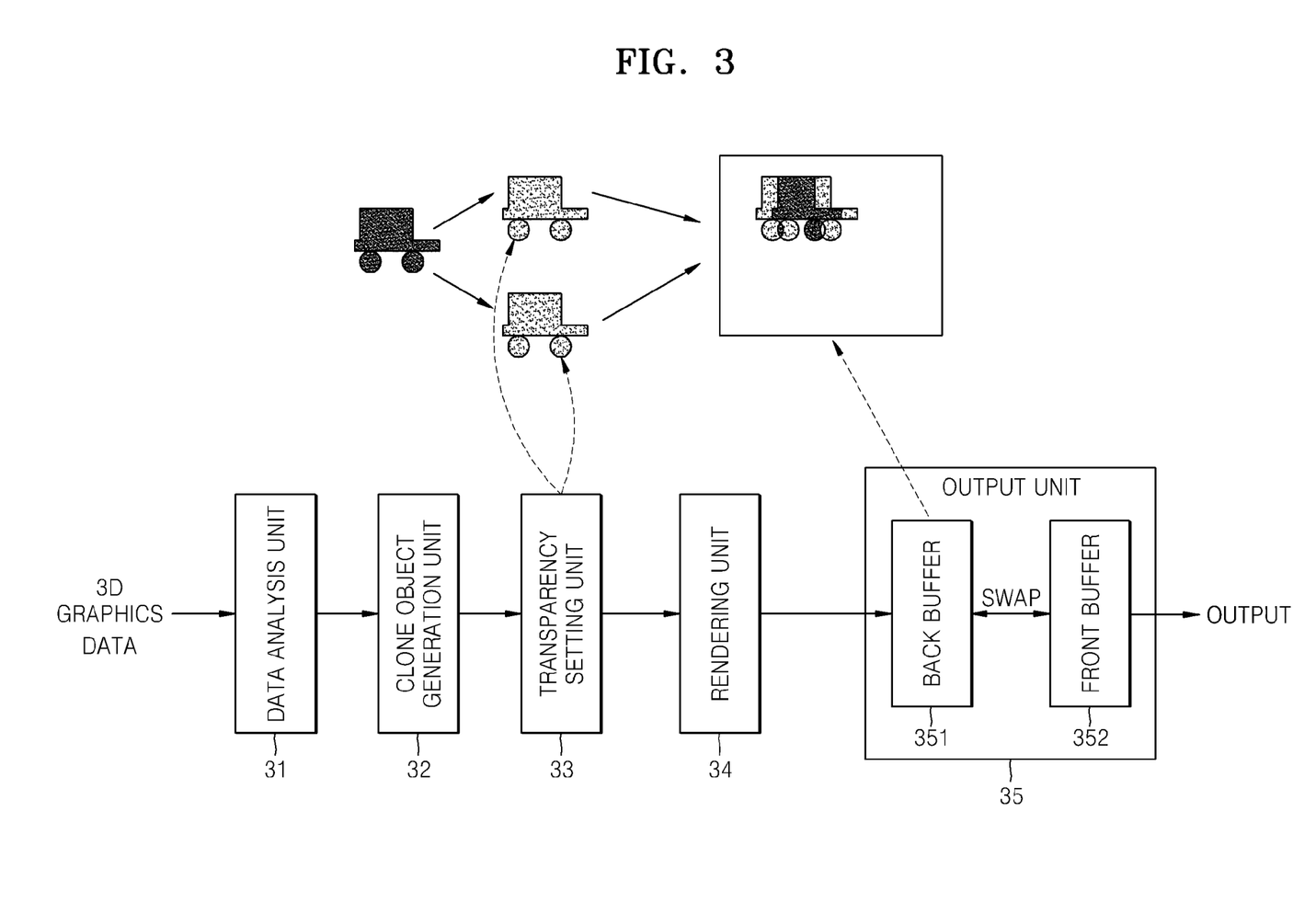
FIG. 3 illustrates a 3D graphics rendering system, according to an embodiment of the present invention.

FIG. 3 illustrates a 3D graphics rendering system, according to an embodiment of the present invention.

Referring to FIG. 3, the 3D graphics rendering system may include, for example, a data analysis unit 31, a clone object generation unit 32, a transparency setting unit 33, a rendering unit 34, and an output unit 35.

As described in the Description of the Related Art, a motion blur effect typically refers to the blurring of an object due to movement. In order to provide a motion blur effect to a viewpoint of 3D graphics data, for example, in the case of a moving picture in which a camera moves, accumulation buffers 12 and 13 generally are needed. In contrast, in order to provide a motion blur effect to a moving picture in which a camera is fixed and the object moves, the accumulation buffers 12 and 13 generally are not necessary. In the former case, the entire image of each frame that forms the moving picture may be completely changed. In the latter case, the background of images of each frame that form the moving picture may be the same, and the position and direction of the object may be changed. Therefore, clone objects of the object to which a motion blur effect is to be applied may be generated over time on any frames that form the moving picture, and an appropriate transparency for the clone objects may be set to be rendered, thereby obtaining images that may be the same as, or similar to, the images obtained using accumulation buffers 12 and 13. The 3D graphics rendering system according to an embodiment of the present invention may embody the ideas described above.

The data analysis unit 31 may receive and analyze 3D graphics data. Also, based on any analysis of the data analysis unit 31, information on the object to which a motion blur effect is to be applied may be detected from the 3D graphics data. Here, the information on the object to which a motion blur effect is to be applied may include, for example, geometric information, material information, and animation information illustrating changes in geometric information and material information. In other words, the data analysis unit 31 may detect information on the object that has motion to the extent that a motion blur effect may be applied. The object that has motion may be detected from among the objects illustrated by 3D graphics data, based on the result obtained by analyzing the 3D graphics data.

The clone object generation unit 32 may generate clone objects of the object to which a motion blur effect is applied using animation information, from among information detected by the data analysis unit 31. Here, the number of clone objects generated by the clone object generation unit 32 generally corresponds to the number of accumulation buffers 12 and 13 illustrated in FIG. 1. Therefore, as the number of clone objects increases, the motion blur effect increases. Consequently, the object may be perceived as softer and faster to human eyes. The number of clone objects may be determined, for example, by a user or may be automatically determined according to hardware resources of the mobile device to which one or more embodiments of the present invention are applied and by the characteristics of the object to which a motion blur effect may be applied.

In more detail, the clone object generation unit 32 may determine at least two time points in the time interval included in animation information of the object to which a motion blur effect is to be applied. For example, when the time interval included in animation information of the object to which a motion blur effect is to be applied is 0 to 1, the clone object generation unit 32 may select the time points at, e.g., 0.3 and 0.7. In addition, the clone object generation unit 32 may generate clone objects of the object to which a motion blur effect is to be applied, using animation information that corresponds to the at least two time points determined as described above. In the example described above, the clone object generation unit 32 may generate two clone objects that correspond to the time points of 0.3 and 0.7 using animation information that corresponds to the time points of 0.3 and 0.7, for example, values of position, direction, and color. These clone objects may include information that is the same as information of the original object. However, when an animation value is different, it may be deemed that the clone objects are not from the original object.

The transparency setting unit 33 may set transparency alpha of each clone object generated by the clone object generation unit 32 based on the number of clone objects. For example, the transparency setting unit 33 may divide the transparency alpha of the object to which a motion blur effect is to be applied into the number of clone objects generated by the clone object generation unit 32. Then, the result obtained after dividing may be set as transparency alpha values for each of the clone objects generated by the clone object generation unit 32. A role of the transparency setting unit 33 may be to provide transparency to at least two clone objects respectively, generated by the clone object generation unit 32 and thus to obtain the rendering result of the clone objects that is the same as or similar to the rendering result obtained using the accumulation buffers 12 and 13.

In general, values of transparency alpha range from 0 to 1. When the value of alpha is 0, the object is usually completely transparent and when the value of alpha is 1, the object is usually completely opaque. The object to which a motion blur effect is applied is generally an opaque object, that is, the object may have an alpha value of 1. Therefore, the transparency setting unit 33 may set transparent values of each of the clone objects to have the sum total of transparency alpha values of 1. As also described above, when two clone objects are generated, the transparency setting unit 33 may set transparency alpha of both clone objects as 0.5.

The rendering unit 34 may render 3D graphics data including the clone objects having transparency set by the transparency setting unit 33 in a back buffer 350. More specifically, the rendering unit 34 may divide 3D graphics data including the clone objects having transparency set by the transparency setting unit 33 into transparent objects and opaque objects. In an embodiment, the opaque object may be rendered first, and then the transparent object rendered, although other orders are possible. In particular, the rendering unit 34 may render the transparent object at the viewpoints of 3D graphics data, for example, sequentially from the position furthest from the camera. A method of efficiently rendering the opaque object and the transparent object is disclosed in detail in Korean Patent Application No. 2004-0027154. Consequently, since the rendering unit 34 may sequentially render the clone objects having transparency set by the transparency setting unit 33 in the back buffer 351, a motion blur effect may be performed. From the rendering results, transparency alpha of the portion where the clone objects overlap may be calculated, for example, according to Equation 1 below.

$$\text{Alpha } c = \text{Alpha } a + \text{Alpha } b*(1-\text{Alpha } a) \qquad \text{Equation 1}$$

As mentioned above, when transparency alpha of both clone objects is set as 0.5, transparency alpha of the portion where the clone objects overlap may be 0.5+0.5*(1−0.5)=0.75.

However, the conventional 3D graphics rendering apparatus using the accumulation buffers 12 and 13 illustrated in FIG. 1 generally calculates the average of images that correspond to the rendering result stored in each of the accumulation buffers 12 and 13, unlike the 3D graphics rendering system according to an embodiment of the present invention, which may provide transparency to both clone objects and then render the clone objects. Thus, transparency alpha of the portion where the opaque objects do not overlap may be (transparency of the opaque objects)/(number of accumulation buffers), that is, 1/2=0.5, as in an embodiment of the present invention. However, transparency alpha of the portion where the opaque objects overlap may be (the sum total of transparency of the opaque objects)/(number of accumulation buffers), that is, 2/2=1, in at least the present embodiment. Therefore, transparency alpha of the portion where the opaque objects overlap may change little. However, it will be understood by those of ordinary skill in the art that in order to approach the proximity effect with the conventional motion blur effect using the accumulation buffers 12 and 13, the transparency setting unit 33 may add a predetermined weight to the result of Equation 1 and set the transparency of each clone object.

The output unit 35 may output images that correspond to the rendering result on a display device (not illustrated) such as a Cathode Ray Tube (CRT) monitor or a Liquid Crystal Display (LCD) monitor. In order to replace images to be softened, where the images correspond to frames that form an output display, the output unit 35 may include, for example, the back buffer 351 and a front buffer 352. In other words, while the output unit 35 may output an image stored in the front buffer 352 on the display device, the rendering unit 34 may render 3D graphics data in the back buffer 351. When rendering by the rendering unit 34 is completed, that is, when one image is completed according to rendering by the rendering unit 34 and stored in the back buffer 351, the output unit 35 may replace the image stored in the front buffer 352 with the image stored in the back buffer 351.

Figure 4:
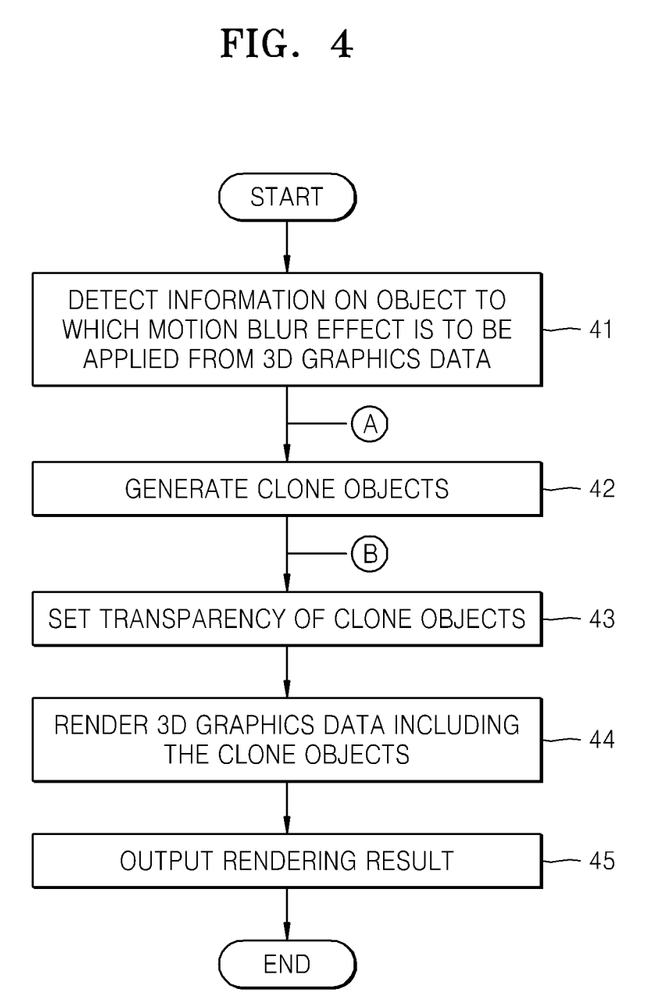
FIG. 4 illustrates a 3D graphics rendering method, according to an embodiment of the present invention.

FIG. 4 illustrates a 3D graphics rendering method according to an embodiment of the present invention.

Referring to FIG. 4, the 3D graphics rendering method may include time series operations performed in the 3D graphics rendering system illustrated in FIG. 3. Therefore, even though some of the contents are omitted below, the description on the 3D graphics rendering system of FIG. 3 described above may be applied to the 3D graphics rendering method.

In operation 41, the 3D graphics rendering system may receive and analyze 3D graphics data, thereby detecting information on an object to which a motion blur effect is to be applied from the 3D graphics data.

In operation 42, the 3D graphics rendering system may generate clone objects of the object using animation information of the object to which a motion blur effect is to be applied, from among information detected in operation 41.

In operation 43, the transparency setting unit 33 included in the 3D graphics rendering system may set transparency alpha of each of the clone objects generated by the clone object generation unit 32 based on the number of clone objects.

In operation 44, the 3D graphics rendering system may render 3D graphics data including the clone objects that had the transparency set in operation 43 in the back buffer 351.

In operation 45, the 3D graphics rendering system may output images that correspond to the rendering result of operation 44 to a display device (not illustrated) such as a CRT monitor or an LCD monitor.

Figure 5:
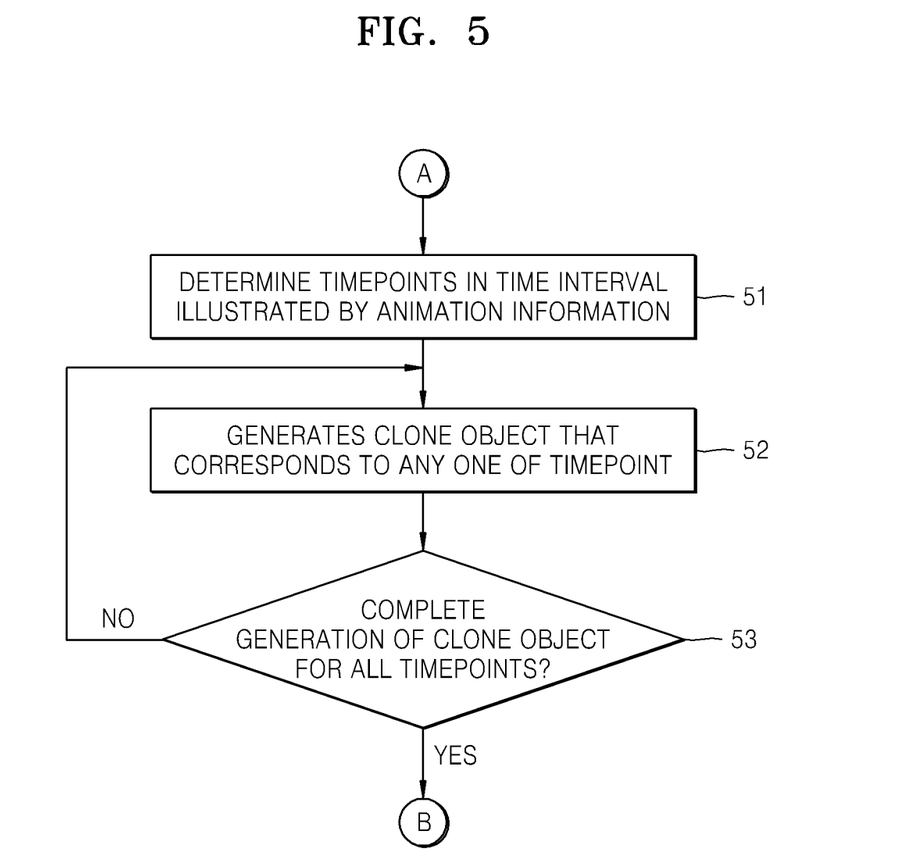
FIG. 5 illustrates a clone object generating operation, e.g., as illustrated in FIG. 4, according to an embodiment of the present invention.

FIG. 5 illustrates operation 42 of FIG. 4.

Referring to FIG. 5, operation 42 may include time series operations, such as those performed in the clone object generation unit 32 illustrated in FIG. 3.

In operation 51, the clone object generation unit 32 may determine at least two time points in the time interval included in animation information of the object to which a motion blur effect is to be applied.

In operation 52, the clone object generation unit 32 may generate the clone object that corresponds to one time point using animation information corresponding to any one of the time points determined in operation 51.

In operation 53, the clone object generation unit 32 may identify whether generation of the clone object for all time points determined in operation 51 has been completed. As a result, when it is completed, operation 43 may proceed. When it is not yet completed, the process may return to operation 52.

As described above, in one or more embodiments of the present invention, clone objects of an object may be generated based on animation information of the object to which a motion blur effect is to be applied, and 3D graphics data including the generated clone objects may be rendered, thereby providing a motion blur effect without using accumulation buffers. Consequently, one or more embodiments of the present invention provide a solution for problems occurring in the conventional 3D graphics rendering system using accumulation buffers, which must have excellent calculation ability and large memory resources. In addition, a motion blur effect may be provided in a mobile device where hardware resources such as memory resources and calculation ability are limited.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A rendering method comprising:

generating, using a processor, a plurality of clone objects corresponding to a predetermined object having a motion in 3D space to which a motion blur effect is to be applied, based on information of the predetermined object illustrated by graphics data;

setting transparency of each of the generated clone objects; and rendering the 3D graphics data including the generated plurality of clone objects having the set transparency to a buffer, wherein transparency of the portion where the clone objects overlap from the rendering results, is different from the set transparency, wherein the number of generated clone objects is determined according to hardware resources of a device rendering the 3D graphics data.

2. The method of claim 1, wherein the setting comprises:

dividing a value representing transparency of the predetermined object by the number of clone objects generated; and setting transparency of each of the clone objects using the result obtained after dividing.

3. The method of claim 1, wherein the generating comprises:

determining at least two time points in a time interval given by animation information of the detected object; and generating a plurality of clone objects of a predetermined object based on animation information that correspond to any one of the time points, wherein the generating is repeated according to the number of time points.

4. The method of claim 1, wherein the rendering is performed by dividing the predetermined object illustrated by 3D graphics data including the plurality of clone objects into transparent objects and opaque objects and rendering the opaque objects first, followed by the transparent objects.

5. The method of claim 1, further comprising outputting the rendered graphics data.

6. The method of claim 1, wherein the sum of the transparencies of the generated cloned objects is 1.

7. The method of claim 1, wherein the transparency of each of the generated clone objects is set equally as one value which is in inverse proportion to a number of clone objects generated.

* * * * *